United States Patent
Schulz

Patent Number: 6,123,640
Date of Patent: Sep. 26, 2000

[54] HIGH REDUCTION PLANETARY GEAR WITH INTERMEDIATE SHAFTS

[75] Inventor: Horst Schulz, Friedrichshafen, Germany

[73] Assignee: ZF Friedrichshafen AG, Friedrichshafen, Germany

[21] Appl. No.: 09/091,939

[22] PCT Filed: Jan. 22, 1997

[86] PCT No.: PCT/EP97/00288

§ 371 Date: Jun. 25, 1998

§ 102(e) Date: Jun. 25, 1998

[87] PCT Pub. No.: WO97/27410

PCT Pub. Date: Jul. 31, 1997

[30] Foreign Application Priority Data

Jan. 27, 1996 [DE] Germany ............... 196 03 004

[51] Int. Cl.[7] .................................... F16H 57/08
[52] U.S. Cl. ............... 475/341; 475/338; 475/336
[58] Field of Search .................... 475/338, 339, 475/340, 341, 342, 336, 344, 252, 313, 319, 325

[56] References Cited

U.S. PATENT DOCUMENTS

| | | | |
|---|---|---|---|
| 1,499,763 | 7/1924 | Davis | 475/341 X |
| 2,211,413 | 8/1940 | Ford | 475/325 X |
| 2,220,174 | 11/1940 | Ravigneaux | 475/280 |
| 2,748,623 | 6/1956 | Hill | 475/342 X |
| 2,761,333 | 9/1956 | Ravigneaux | 475/280 |
| 3,216,270 | 11/1965 | Nasvytis | 475/335 X |
| 3,330,171 | 7/1967 | Nasvytis | 475/340 X |
| 4,196,889 | 4/1980 | Dudek | 475/318 X |
| 4,366,727 | 1/1983 | Jonsson | 475/342 |
| 4,429,594 | 2/1984 | Heller | 475/342 |
| 4,892,011 | 1/1990 | Nishida et al. | 475/342 X |
| 5,171,195 | 12/1992 | Funamoto | 475/342 |
| 5,242,336 | 9/1993 | Hori | 475/338 X |
| 5,409,430 | 4/1995 | Hashimoto et al. | 475/331 |
| 5,704,864 | 1/1998 | Yanagisawa | 475/341 X |
| 5,910,066 | 6/1999 | Schulz et al. | 475/338 X |

FOREIGN PATENT DOCUMENTS

| | | |
|---|---|---|
| 620670 | 4/1927 | France . |
| 26 25 429 | 12/1977 | Germany . |
| 195 25 831 A1 | 1/1997 | Germany . |
| 1 551 325 | 8/1979 | United Kingdom . |

*Primary Examiner*—Charles A Marmor
*Assistant Examiner*—Ha Ho
*Attorney, Agent, or Firm*—Davis and Bujold

[57] ABSTRACT

A planetary gear has two axially adjacent ring gears (11, 12), several planet wheels (10) mounted inside a planet carrier (2) so as to rotate and a central sun wheel (1). Between two planet wheels (10) is provided each time an intermediate shaft (6) and each shaft has two sets of teeth (7, 8), the smaller set of teeth (8) being provided for simultaneous engagement with two adjacent planet wheels (10) between which the intermediate shaft (6) is situated, and the second set of teeth (7), the reference circle of which is larger than that of the first one, engages with the central sun wheel (1).

22 Claims, 6 Drawing Sheets

HIGH REDUCTION PLANETARY GEAR WITH INTERMEDIATE SHAFTS

The invention relates to a planetary gear of the type described in more detail below.

BACKGROUND OF THE INVENTION

Planetary gears of this type are generally known. The planet wheels each have two sets of teeth for permanent meshing with two ring gears. They thus form a so-called Wolfrom coupling gear. The speed ratio of the planet carrier to the ring gear provided for the output is designated the Wolfrom ratio. In the planetary gears known already, the central sun wheel meshes directly with the planet wheels and forms a preliminary ratio with the planet wheels and the stationary ring gear of the two ring gears. The Wolfrom ratio, multiplied by the preliminary ratio, results in the total ratio.

Many tasks for such planetary gears, especially in robot technology, require high ratios with, for example, i=170 or still higher. But it is often desirable that the diameter of the central sun wheel not be too small since, for example, it may be provided with a hollow shaft for accommodating a shaft end of an engine or for conveying robot parts. Besides, it is often desirable to limit the Wolfrom ratio. But it is disadvantageous that moderate values regarding tooth rolling activity, noise, efficiency, heating and inertia result only from a limitation of the speeds of the planet carrier. On the other hand, with a limited Wolfrom ratio it also becomes difficult also to achieve elevated total ratios.

Since the driving central sun wheel is directly engaged with the planet wheels, in the formerly known planetary gear designs, it must be equal to them in module and other toothing data.

In the solutions known already, the obtention of high ratios brings, along with the above mentioned disadvantages, the further disadvantage that in cases having a maximum number of three planetary wheels, a weak torque tightness exists and problems can result regarding the uniformity of the output torque. The small number of sun wheel teeth needed for a sufficiently high total ratio brings, together with the problems associated with the parts of a robot environment, the added disadvantages relating to tooth shape, such as undercut or pointed tips. A further disadvantage is that this requires a relatively high number of teeth on ring gears having relatively small modules, and the torque tightness disadvantages resulting therefrom.

Therefore, the problem on which this invention is based is to obtain high ratios with a good utilization of installation space (torque tightness) while, as far as possible, overcoming the above mentioned disadvantages or at least clearly reducing them. In addition, transmission quality is to be improved, that is, vibrations and angular transmission errors must be minimized. Also, the planetary gear must have favorable production characteristics and require no elevated assembly cost.

SUMMARY OF THE INVENTION

The development of the planetary gear, in accordance with the invention, makes possible high preliminary ratios whereby a moderate Wolfrom ratio can be selected in spite of a high total ratio. In addition, internal tooth rolling activity, noise, efficiency, heating and inertia remain within advantageous limits. This means that good conditions exist for the gear play to have a long lasting stability. By virtue of the moderate Wolfrom ratio it is also possible to use additional planetary wheels in the number of 4, 6 or in pairs, when needed. Also, as a rule, a moderate or lesser Wolfrom ratio means greater optional differences in the number of teeth of the two ring gears. As result of assembly conditions, the number of planet wheels is generally in direct relationship with the difference in the number between teeth of the two ring gears.

In addition, a high number of planet wheels results in a good torque tightness. The intermediate shafts can be accommodated in the planet carrier practically without requiring additional space. Further, it is advantageous that the central sun wheel can be designed to have a hollow shaft depending on the desired total ratio, since the diameter of the sun wheel teeth can always be considerably larger than in the known solutions.

Another advantage is that the module of the input step, namely, sun wheel/second set of teeth of the intermediate shaft, can be especially selected with more accuracy than in known Wolfrom sets so that small numbers of teeth, and the tooth shape problems related thereto such as undercut and/or pointed teeth, do not occur.

Also, a cost advantage results because of the fact that it is possible to build a whole ratio series with always equally designed Wolfrom sets since only the ratio of the input step has to be varied.

As a result of the moderate Wolfrom ratio, all the gear parts loaded with high torques, which have, however, a large portion of total weight, operate more slowly and thus produce lesser inertia effects. The quick-spinning gear parts, on the other hand, are loaded with relatively weaker forces and can be designed with relatively small bulk.

By the advantageous development of the object of the invention, extensively balanced forces of the teeth set result on the first, smaller, intermediate shafts' teeth, whereby the support thereof becomes easier and simpler. The exact angular value for the arrangement of the intermediate shafts can be selected according to assembly conditions taking into account the tooth number combination and the number of planet wheels.

By the features of the invention, a good spatial arrangement is obtained which ensures a problem free accommodation of the second, larger, intermediate shafts' teeth sets, which is of particular advantage in the case of high ratios.

The features proposed in the invention permit larger active line spaces between the two sets of teeth of the intermediate shafts which facilitates the support thereof.

The assembly is clearly simplified by the features of the invention. The two sets of teeth of the intermediate shafts can be precisely pre-assembled and pre-fabricated outside the planet carrier precisely according to the teeth position.

According to the invention, it is possible to situate only one radially leading roller bearing on the intermediate shafts and the central sun wheel and then locate it axially removed from the respective tooth engagements. In this manner, it is possible to utilize the angular mobility, normally always present in a small amount, of the roller bearing concerned. The set of teeth is thus self-adjusting and self-centering. The self-centering in the tooth engagements effects a uniform load distribution between the planet wheels. In addition, this load compensation between the planet wheels acts to internally compensate for teeth set graduation errors so that they act upon the output shaft only to a small extent. The advantage of this is precise operation with only slight vibration.

By the reinforcement of the planet carrier side plate according to the invention, it is possible to avoid local reductions in strength of the planet carrier resulting from the additional support holes for the intermediate shafts.

Another feature of the invention is that by having intermediate shaft teeth formed as non-rotatably connected spur gears, a simple assembly is obtained while ensuring the requirements of teeth position.

Another feature of the invention is that the ring gears and the intermediate shaft's smaller teeth set may be conical. This results in gear play adjustability due to the possibility of axially adjusting the teeth set parts.

The tilted teeth set according to the invention produces a precise, noiseless operation with only slight vibration.

The axial support of the planetary wheels can be relatively simply designed when the features of the helically cut gears and teeth according to the invention are provided. This design extensively compensates the axial thrusts specifically.

Also, it is possible to simplify the support of the intermediate shafts as a result of good compensation forces, since the axial thrusts are actually clearly reduced.

Another feature is that the planetary gear may be cylindrical, which results in input step (namely, the sun wheel/second set of teeth of the intermediate shafts) teeth engagement insensitivity relative to axial displacement movements in relation to the sun wheel.

Another feature of the invention is that the second sets of teeth of the intermediate shafts may be cylindrical resulting in a reduction of the effects of the backlash upon the total play in the input step since, by the features according to the invention, the central sun wheel can be designed relatively large. Also, during a sun wheel self-centering, the backlash can be chosen narrower in the teeth engagements since distance errors have less effect. This feature also reduces the number of required conical sets of teeth and the number of gear parts to be adjusted.

Another feature of the invention is that when the difference in the number of teeth between the two ring gears is chosen to be at least twice as high as the number of planet wheels, the Wolfrom ratio is advantageously effectively reduced and therewith internal tooth rolling activity, noise, friction torques, heating, and inertia torque. This becomes possible because of the preliminary ratio obtainable by the intermediate shafts whereby the Wolfrom ratio can be advantageously reduced in the countermove.

Simpler planet wheel production may be achieved by the features according to the invention. This is advantageous since the planet wheels are at least quadrupled in the planetary gear.

A kinematically precise engagement of the first set of teeth of the intermediate shafts with the planet wheels is accomplished by an adequate axis of rotation according to the invention.

Another advantageous application of the idea of the invention is a gear where the kinematic values of the teeth engagements, on both ring gears, can be optimized independently of each other. This may be achieved by the features according to the invention. Here, a clear graduation will, in general, be provided.

Another feature of the invention is that simple assembly conditions are provided.

Another an advantageous application of the idea of the invention is to a gear wherein the kinematic values of the teeth engagements on both ring gears can be optimized independently of each other. At the same time, the cost of clearance setting discs and also the number of bearings can be reduced. Additionally, a reduction in cost results from the simple production of planet carriers not having inclined axles. Here, each planet wheel receives two opposite sets of conical teeth.

By the invention, the conical sets of teeth of the planet wheels can be designed graduated, especially clearly graduated.

By said steps, the Wolfrom ratio can likewise be effectively reduced and therewith internal tooth rolling activity, noise, friction torques, heating, and inertia torque. This becomes possible by the emphasis, to the invention, of the preliminary ratio.

According to the invention, by integrating the bearing pathways in the ring gears, space is clearly saved so that more space is available in order to accomplish a high ratio with spatial accommodation of all wheels within a narrow space.

BRIEF DESCRIPTION OF THE DRAWING(S)

Embodiments of the invention are described in principle herebelow with the aid of the drawings. In the drawings.

DESCRIPTION OF THE PREFERRED EMBODIMENT(S)

Since planetary gears of this kind are basically known, only the parts thereof essential to the invention will be briefly described herebelow.

The planetary gear has a central sun wheel 1, on the input side, which is rotatably supported by a planet carrier 2. The planet carrier 2 has two side plates 3 and 4 (first and second side plates 3, 4, respectively) interconnected by intermediate webs 5. Two intermediate shafts 6 are floatingly supported on the side plate 4 of the planet carrier 2. Each intermediate shaft 6 has two sets of teeth, namely, a larger set of teeth 7 (located adjacent a first end of the intermediate shaft 6) and a smaller set of teeth 8 (located adjacent a second end of the intermediate shaft 6). The larger set of teeth 7, which can be designed as a gear and is non-rotatably set upon the intermediate shaft 6, is engaged with the sun wheel 1. As can be seen further from FIGS. 2 to 6, the sun wheel 1 and the larger set of teeth 7 are outside the two side plates 3 and 4, or upon the outer side of the side plate 4 remote from the side plate 3. The smaller set of teeth 8 can be designed either integrally with the intermediate shaft 6 or as a separate gear non-rotatably connected with the intermediate shaft 6.

A total of four planet wheels 10 are supported over shafts 9 by needle bearings in the side plates 3 and 4 of the planet carrier 2.

A stationary ring gear 11 and a rotary ring gear 12, which constitute the output side, are meshed with the planet wheels 10.

Between the stationary (first) ring gear 11 and the rotary (second) ring gear 12 that forms the gear output shaft, a main bearing 13, not shown in further detail, is situated where the pathways of the rolling body are directly integrated into both ring gears.

To reinforce the side plate 4 of the planet carrier 2 in which the intermediate shafts 6 with their bearings 14 are contained, said side plate 4 is reinforced in the area of the supporting holes for the bearings 14 by respective ribs or a web 15 (see the dotted illustration of FIG. 1 and FIGS. 2 to 6).

Figure 1:
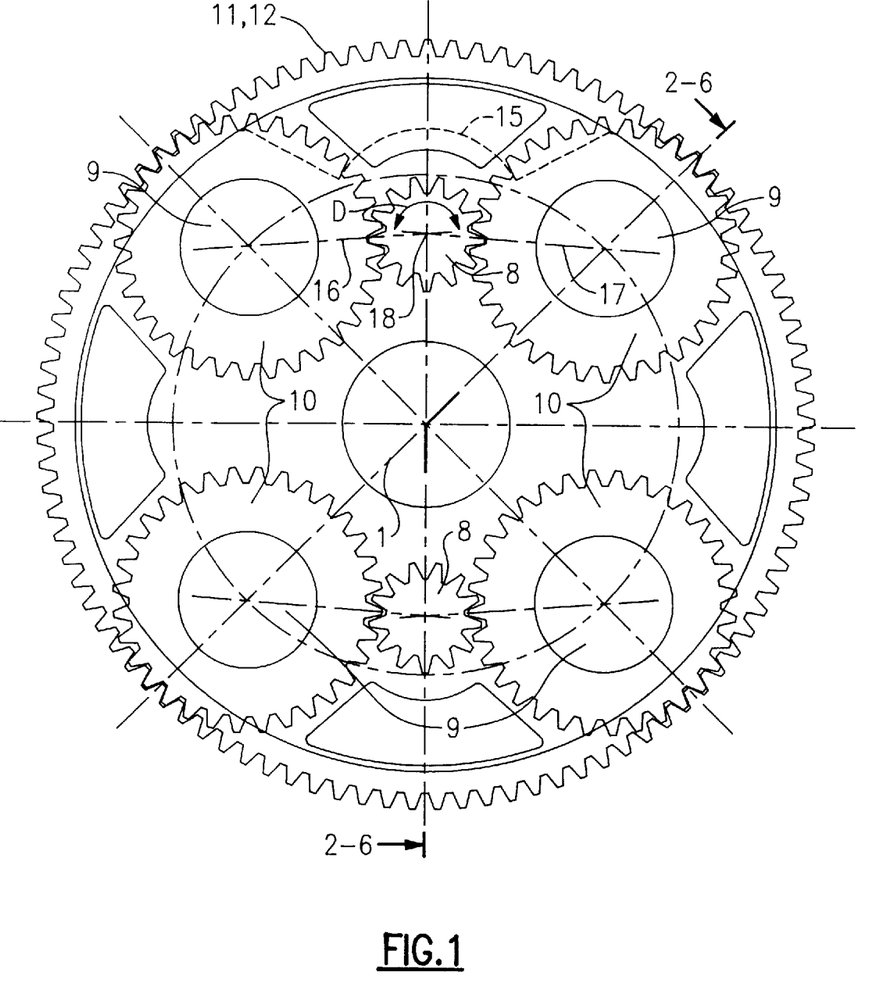
FIG. 1 is a basic front view illustration of the sets of teeth of the planet wheels according to the invention.

It can be seen further from FIG. 1 that the connecting lines 16 and 17 of the central points of the axles (planetary gear axes) of two planet wheels 10 (jointly meshing with the smaller set of teeth 8 of the intermediate shaft 6 lying therebetween) form, in conjunction with the central point of the axle (intermediate shaft axis) 18 of the appertaining intermediate shaft 6, as seen in the vertical axis section, an angle D of between 180° and 195°.

The embodiments, shown in FIG. 2 through 6, are basically of the same design for which reason the same reference numerals have been retained. They differ only by the design and position of the planet wheels, ring gears and intermediate shafts with the sets of teeth thereof.

Figure 2:
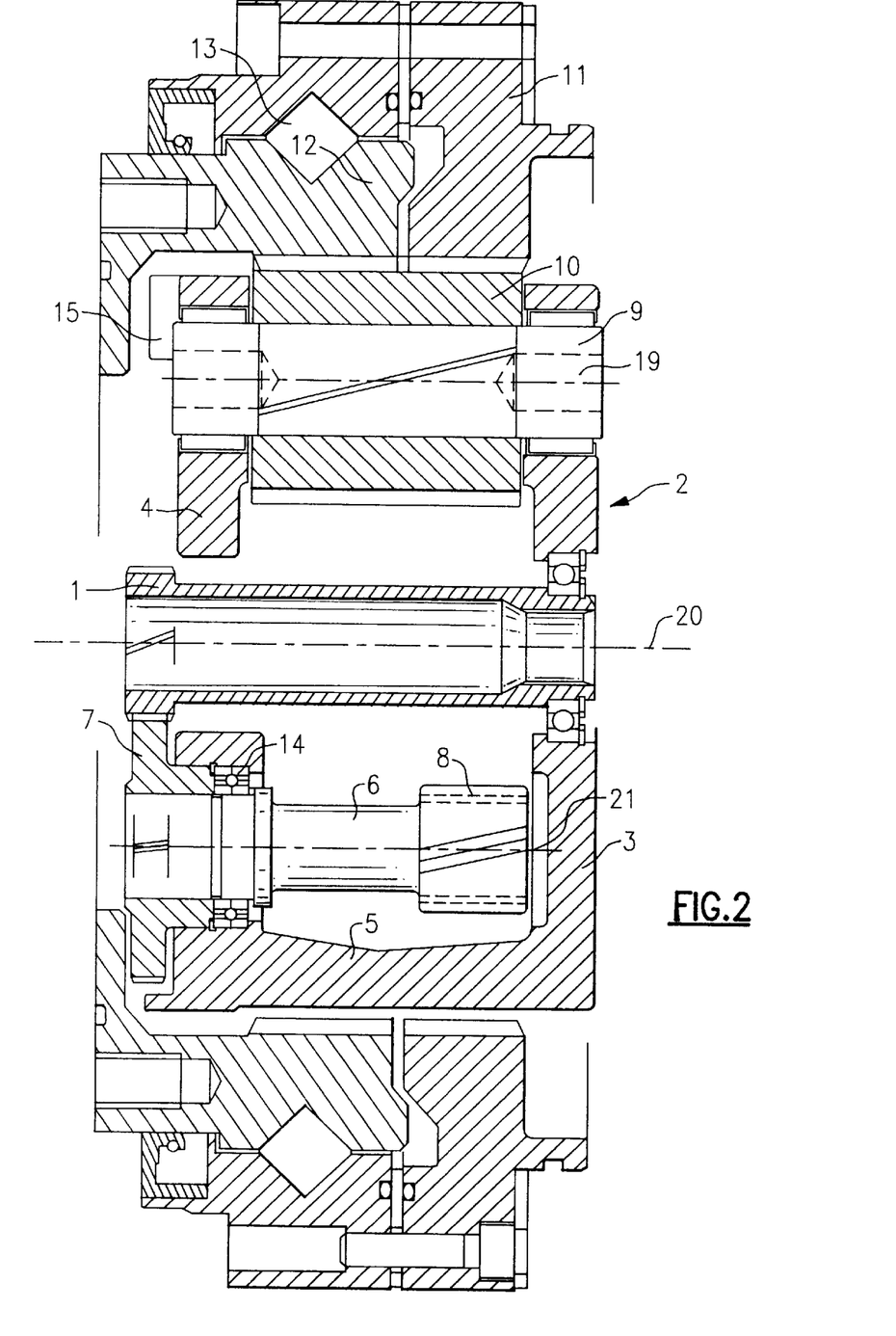
FIG. 2 is a section along line II—II to VI—VI of FIG. 1 with cylindrically continuous planet wheels and cylindrical ring gears.

Thus, FIG. 2 shows a planetary gear with cylindrically continuous planet wheels 10 and cylindrical ring gears.

Figure 3:
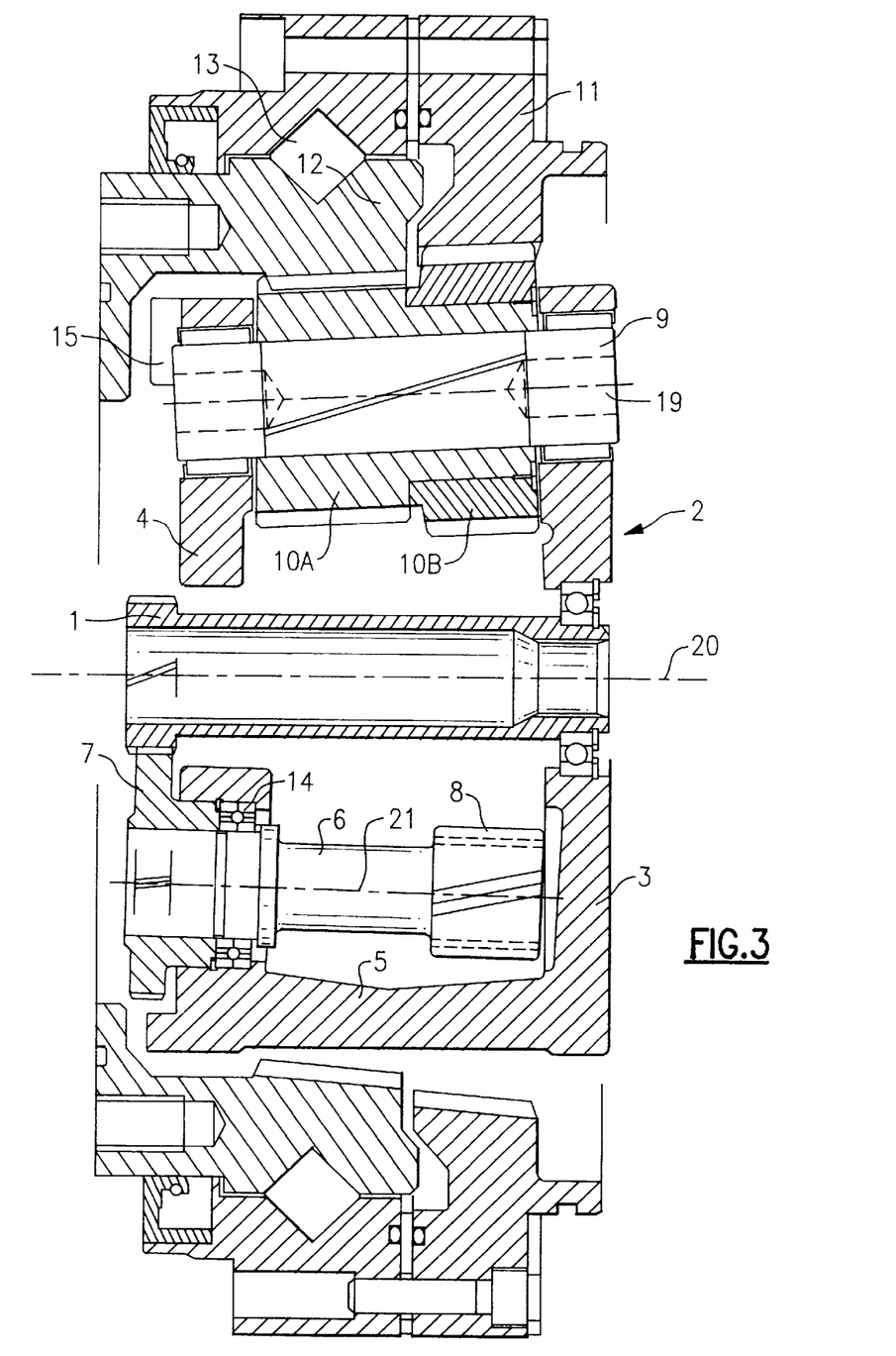
FIG. 3 is a planetary gear with cylindrically graduated planet wheels and conical ring gears in a section corresponding to that of FIG. 2.

FIG. 3 shows a planetary gear with two cylindrically graduated planet wheel sets of teeth 10A and 10B situated on each shaft 9 and conical ring gears 11 and 12. As can be seen, the axles 19 of the shafts 9 are slightly tilted with respect to the main axle (main rotational axis) 20 of the planetary gear. The angle of the slant here can amount to 3° and extends from the side plate 4 outwardly in a direction towards the side plate 3.

Likewise, the longitudinal axles 21 of the intermediate shafts 6 are similarly tilted with respect to the main axle 20 of the planetary gear. The angle of the inclined position can amount to about 2°–2.5° and also extends outwardly starting from the side plate 3 in direction towards the side plate 4.

Figure 4:
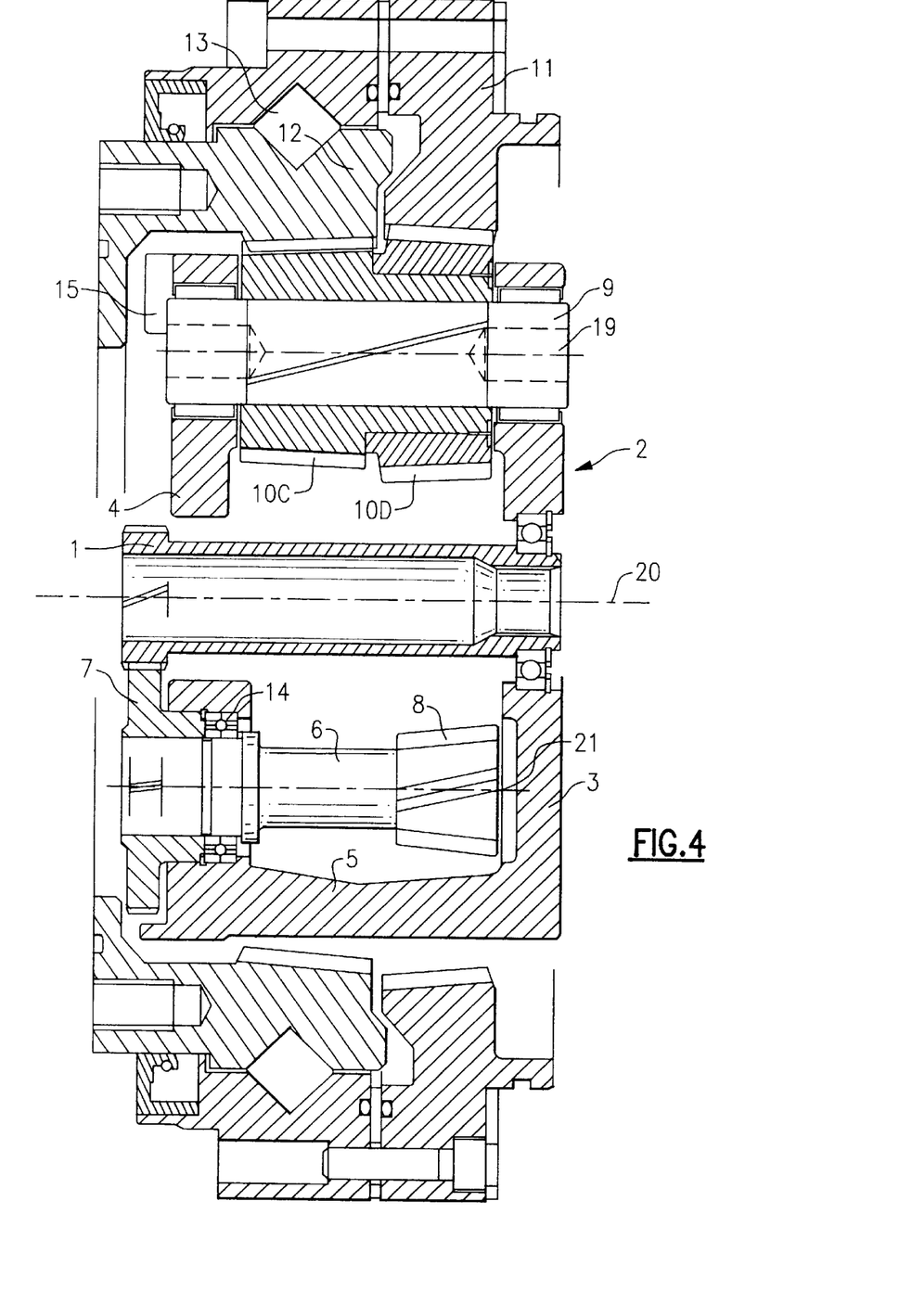
FIG. 4 is a planetary gear with double conical planet wheels in a section corresponding to that of FIG. 2.

FIG. 4 shows a planetary gear with double conical planet wheel sets of teeth 10C and 10D, the shafts 9 of the intermediate shafts 6 lying paraxially to the main axle 20 of the planetary gear. The sets of teeth of the two ring gears 11 and 12 obviously here are adapted to the double conically shaped planet wheel sets of teeth 10C and 10D.

Figure 5:
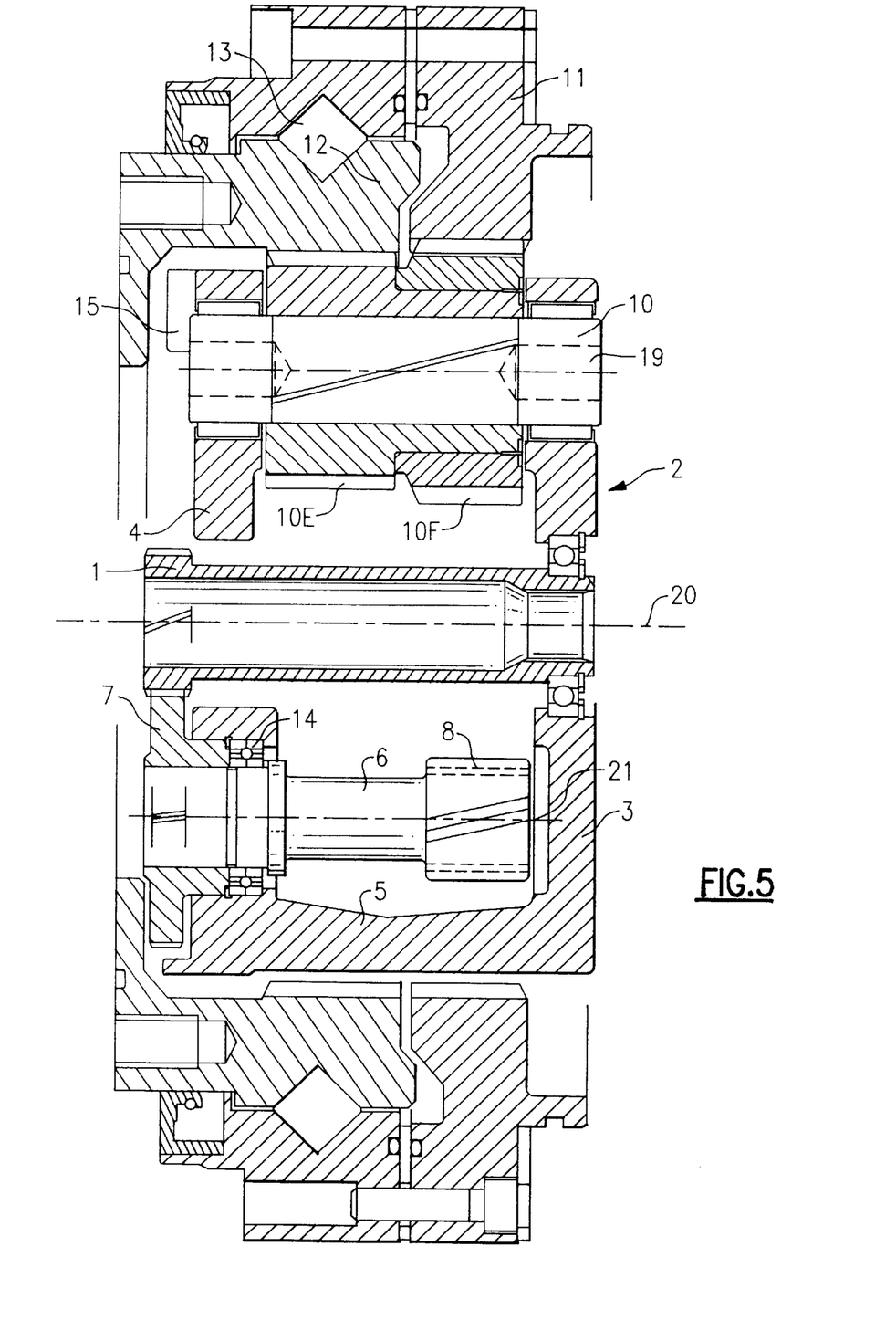
FIG. 5 is a planetary gear with cylindrically graduated planet wheels and cylindrical ring gears in a section corresponding to that of FIG. 2.

FIG. 5 shows a planetary gear having two cylindrically graduated planet wheel sets of teeth 10E and 10F, cylindrical ring gears 11 and 12, and cylindrical smaller gears 8 on the intermediate shafts 6.

Figure 6:
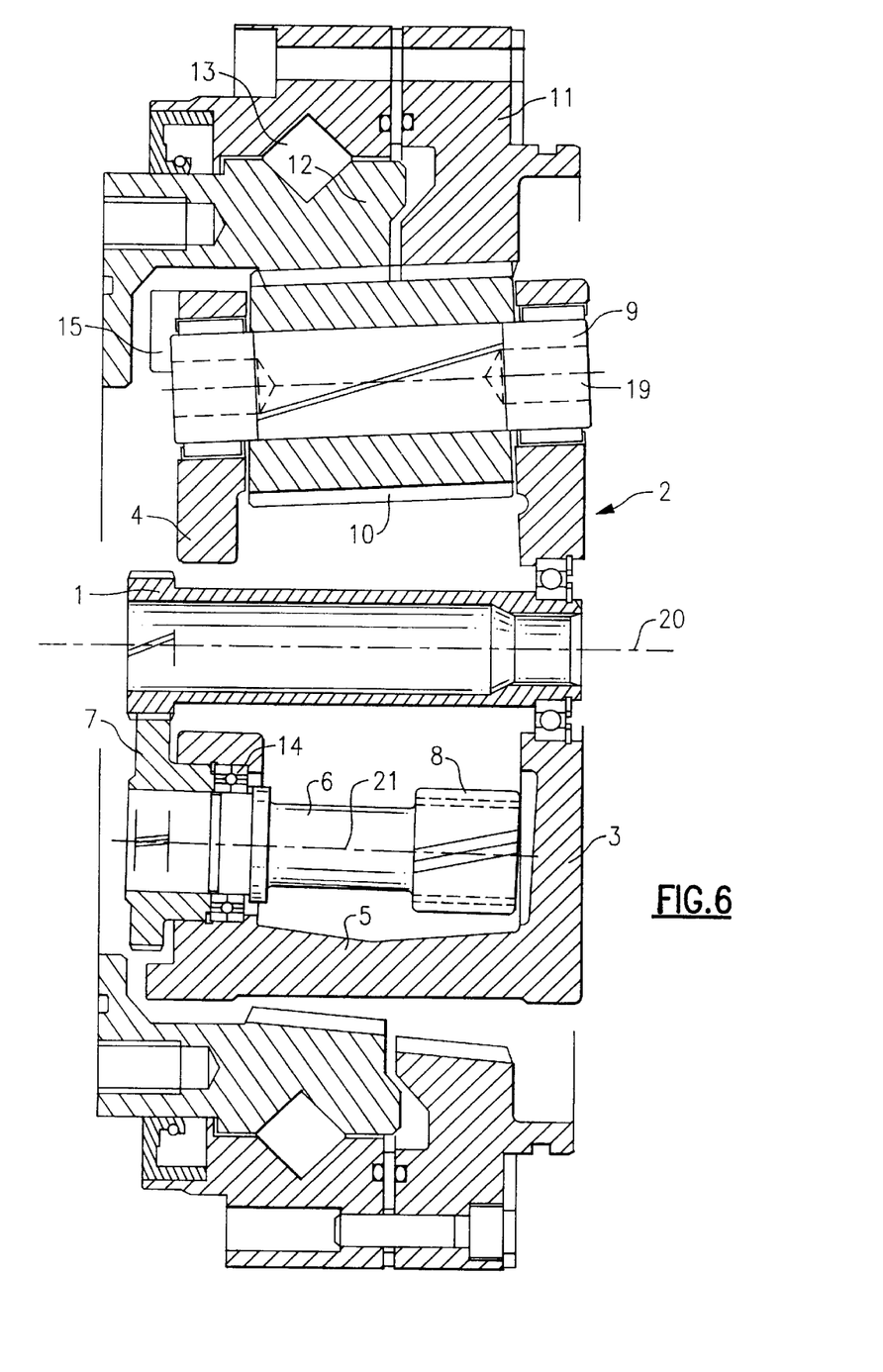
FIG. 6 is a planetary gear with cylindrically continuous planet wheels and conical ring gears in a section corresponding to that of FIG. 2.

FIG. 6 shows a planetary gear having cylindrically continuous planet wheels 10, as the design of FIG. 2 also shows. In the same manner as in the embodiment of FIG. 3, the ring gears 11 and 12 are conical and the longitudinal axles 19 of the four shafts 9, the same as the longitudinal axles 21 of both intermediate shafts 6, are inclined toward the main axle 20 of the planetary gear.

The smaller sets of teeth 8 of the intermediate shafts 6 can mesh with the areas of the teeth sets of the planet wheels 10, which are meshed with the ring gear 11 that is farther removed from the larger sets of teeth 7 of the intermediate shafts 6. But the reverse arrangement is also possible, that is, the smaller sets of teeth 8 of the intermediate shafts 6 can mesh with the areas of the teeth sets of the planet wheels 10 which mesh with the ring gear 12 that is nearer to the larger set of teeth 7 of the intermediate shafts 6.

As can be seen, the smaller sets of teeth 8 of the intermediate shafts 6 and also the sets of teeth of the sun wheel 1 are each floatingly supported by the tooth engagements of the respective gears meshing therewith.

The larger sets of teeth 7 of the intermediate shafts 6 can be designed as separate spur gears which are non-rotatably connected with the intermediate shafts 6 by means of form-locking sets of teeth having precise tooth position or by shrink-fitting connections. The sets of teeth on at least the two ring gears 11 and 12 and on the planet wheels 10, the same as the sets of teeth of the intermediate shafts 6 which mesh with the planet wheels 10, must be helically cut, that is, provided with involute helical cut teeth or involute helical surfaces.

The helix angles of the sets of teeth on the planet wheels 10 must at least have approximately the same pitch height of the flank lines. The sense of direction of the two helix angles must also be equal.

The central sun wheel 1 and the sets of teeth 7 of the intermediate shafts 6 meshing therewith can likewise have a helical cut, wherein the helix angles of the sets of teeth 7 on the intermediate shafts 6 have pitch heights at least approximately equal to the flank lines. The sense of direction of both helix angles must also be equal.

In the inclined positions of the longitudinal axles 19 of the shafts 9 and of the longitudinal axles 21 of the intermediate shafts 6 with respect to the main axle 20, the inclined positions must be selected so that the inclined positioned axles intersect with the main axle 20 of the gear at least approximately at the same point.

In the design of the planet wheels with cylindrically graduated sets of teeth 10A, 10B, or 10E, 10F (FIGS. 3 and 5), respectively, equal numbers of teeth must be provided.

As can be seen from FIG. 4, both ring gears 11 and 12 can be inclined relative to the main axle of the gear wherein the angles of inclination of both ring gears 11 and 12 and the sets of teeth 10C and 10D of the planet wheels meshing therewith extend opposite to one another.

Both oppositely oriented conical sets of teeth 10C and 10D of the planet wheels are designed to be clearly graduated in the central diameter.

The same applies to the design of the planet wheels with cylindrically graduated sets of teeth 10A, 10B or 10E, 10F, as shown, for example, in FIGS. 3 and 5, wherein the graduation must also be clear.

In a design of the planet wheels with substantially cylindrically graduated sets of teeth, they must be mutually compensated so as to form a constantly continuous cylindrical set of teeth.

It can further be provided that of the larger sets of teeth 7 of the intermediate shafts 6, one set of teeth has a firm, arbitrary coordination of position relative to the smaller set of teeth of the same intermediate shaft 6, while the other set or sets of teeth of the other intermediate shaft or intermediate shafts 6 is adjustably designed, via a rotatably mountable connection, and in which a limited torsional play is produced by slightly larger through holes, and the number of screw holes is integrally divisible by the numbers of teeth of the set of teeth to be adjusted (not shown).

| Reference numerals | |
| --- | --- |
| 1 | sun wheel |
| 2 | planet carrier |
| 3 | side plates |
| 4 | side plates |
| 5 | intermediate web |
| 6 | intermediate shaft |
| 7 | larger set of teeth |
| 8 | smaller set of teeth |
| 9 | shafts |
| 10 | planet wheels |
| 10A | sets of teeth of planet wheels |
| 10B | sets of teeth of planet wheels |
| 10C | sets of teeth of planet wheels |
| 10D | sets of teeth of planet wheels |
| 10E | sets of teeth of planet wheels |
| 10F | set of teeth of planet wheels |
| 11 | ring gear |
| 12 | ring gear |
| 13 | main bearing |
| 14 | bearing |
| 15 | web |
| 16 | connecting lines |
| 17 | connecting lines |
| 18 | axle |
| 19 | axles |
| 20 | main axle |
| 21 | longitudinal axles |

What is claimed is:

1. A planetary gear comprising:

a sun gear having a plurality of teeth;

first and second axially adjacent ring gears each having teeth on an inwardly facing surface thereof, and one of the first and second ring gears being a stationary ring gear and the other of the first and second ring gears being a rotatable ring gear and forming an output of the planetary gear; and a plurality of planet gears being rotatably supported by a plurality of planet carriers, each of the plurality of planet gears having external teeth engaging with the teeth of both of the first and the second ring gears, and each of the plurality of planet gears being supported by one of the plurality planet carriers;

wherein an intermediate shaft (6) is situated between an adjacent pair of planet gears (10), each intermediate shaft (6) has a first end with a first set of teeth (7) which engage with the teeth of the sun gear and a second end with a second set of teeth (8) which engage with a respective adjacent pair of planet gears (10), and the first set of teeth (7) has a greater number of teeth than the second set of teeth (8).

2. The planetary gear according to claim 1, wherein each adjacent pair of planet gears (10) rotates about respective planet gear axes and a first connecting line (16), extending from the planet gear axis of one of the adjacent pair of planet gears (10) to a rotational axis of the intermediate shaft (6) situated between that adjacent pair of planet gears (10), forms an angle (D) of between 180° and 195° with a second connecting line (17), extending from the planet gear axis of the other of that adjacent pair of planet gears (10) to the rotational axis of the intermediate shaft (6) situated between that adjacent pair of planet gears (10).

3. The planetary gear according to claim 1, wherein the second set of teeth (8), adjacent the second end of the intermediate shafts (6), meshes with areas of the plurality of planet gears (10) that are remote from the first set of teeth (7) of the intermediate shaft (6).

4. The planetary gear according to claim 1, wherein at least one of the second set of teeth (8) of the intermediate shaft (6) and the teeth of the sun gear (1) is floatingly supported by the planetary gear.

5. The planetary gear according to claim 1, wherein the first set of teeth (7) of the intermediate shaft (6) are formed as separate spur gears which are non-rotatably connected with the intermediate shaft (6) by one of form-locking the first set of teeth at a desired tooth position and a shrink-fitting the first set of teeth on the intermediate shaft (6).

6. The planetary gear according to claim 1, wherein the inwardly facing teeth of both the first and second ring gears (11, 12) and the teeth of the second set of teeth (8) of the intermediate shaft (6) are all conical in shape.

7. The planetary gear according to claim 1, wherein the inwardly facing teeth of both the first and second ring gears (11, 12), the teeth of the plurality of planet gears (10), and the teeth of the second set of teeth (8) of the intermediate shaft (6) are all helically cut teeth.

8. The planetary gear according to claim 7, wherein the helically cut teeth of the plurality of planet gears (10) each have an approximately identical helix angle, approximately identical pitch height of flank lines, and the helix angles all lie in the same direction.

9. The planetary gear according to claim 8, wherein both the sun gear (1) and the first set of teeth (7) of the intermediate shaft (6) meshing therewith have helically cut teeth, and the helix angle of the first set of teeth (7) and the second set of teeth (8) on the intermediate shafts (6) having approximately identical pitch height of flank lines and the helix angles all lie in the same direction.

10. The planetary gear according to claim 1, wherein the sun gear (1) is a substantially cylindrically shaped gear.

11. The planetary gear according to claim 1, wherein the first end of the intermediate shaft (6), carrying the first set of teeth (7) that mesh with the sun gear (1), is a cylindrically shaped gear.

12. The planetary gear according to claim 1, wherein the number of teeth between the first and second ring gears (11, 12) is at least twice as high as a number of planet gears (10) contained in the planetary gear.

13. The planetary gear according to claim 1, wherein the plurality of planet gears (10) each comprises two substantially cylindrical sets of teeth, and the two substantially cylindrical sets of teeth are supported on a respective planetary gear axis (19) that is radially inclined relative to a main rotational axis (20) of the planetary gear.

14. The planetary gear according to claim 13, wherein each intermediate shaft (6) is supported on a respective intermediate shaft rotational axis (21) that is inclined with respect to the main rotational axis (20) of the planetary gear; each of the plurality of planet carries is supported on a respective planetary gear axis (19) that is inclined with respect to the main rotational axis (20) of the planetary gear, and the respective intermediate shaft rotational axes (21) and the respective planetary gear axes (19) all intersect with the main rotational axis (20) of the planetary gear at an approximately similar point.

15. The planetary gear according to claim 13, wherein the plurality of planet gears (10) each comprises two substantially cylindrical sets of teeth, and both substantially cylindrical sets of teeth are graduated.

16. The planetary gear according to claim 15, wherein both graduated substantially cylindrical sets of teeth have each the same number of teeth.

17. The planetary gear according to claim 1, wherein the first and second ring gears (11, 12) are both inclined relative to a main rotational axis (20) of the planetary gear; an angle of inclination of the first ring gear (11) extends opposite to an angle of inclination of the second ring gear (12); each of the plurality of planet gears (10) has oppositely inclined conical sets of teeth (10C, 10D), one of the oppositely inclined conical sets of teeth (10C or 10D) meshes with the first ring gear (11) and the other of oppositely inclined conical sets of teeth (10D or 10C) meshes with the second ring gear (12); and all of the plurality of planet gears (10) and the intermediate shafts (6) are each supported on rotational axes that extend substantially parallel to the main rotational axis (20) of the planetary gear.

18. The planetary gear according to claim 17, wherein both oppositely directed conical sets of teeth (10C, 10D) of the plurality of planet gears (10) graduate toward a central area of each planetary gear.

19. The planetary gear according to claim 18, wherein the oppositely directed conical sets of teeth (10C, 10D) of the plurality of planet gears (10) have each the same number of teeth.

20. The planetary gear according to claim 1, wherein the first ring gear (11) is the stationary ring gear, and a main bearing (13) is situated between the first ring gear (11) and the second ring gear (12) that forms the output, and rolling pathways for a rolling body of the main bearing (13) are directly formed on the first and second ring gears (11 and 12).

21. A planetary gear comprising:

a sun gear having a plurality of teeth;

first and second axially adjacent ring gears each having teeth on an inwardly facing surface thereof, and one of the first and second axially adjacent ring gears being a stationary ring gear and the other of the first and second axially adjacent ring gears being a rotatable ring gear and forming an output of the planetary gear; and a plurality of planet gears being rotatably supported by a plurality of planet carriers, each of the plurality of planet gears having external teeth engaging with the teeth of both of the first and the second axially adjacent ring gears, and each of the plurality of planet gears being supported by one of the plurality planet carriers;

wherein an intermediate shaft (6) is situated between an adjacent pair of planet gears (10), each intermediate shaft (6) has a first end with a first set of teeth (7) which engage with the teeth of the sun gear and a second end with a second set of teeth (8) which engage with a respective adjacent pair of planet gears (10), and the first set of teeth (7) has a greater number of teeth than the second set of teeth (8); and the planet carrier (2) comprises first and second side plates (3, 4) which are connected with one another by an intermediate web (5), and the first end of the intermediate shafts (6), carrying the first set of teeth (7) which engaged with the sun gear (1), projects out past an area defined between the first and second side plates (3, 4) of the planet carrier (2).

22. The planetary gear according to claim 21, wherein the second side plate (4) of the planet carrier (2) contains a respective bearing (14) for guiding each respective intermediate shaft (6), and each respective bearing is disposed in a respective insertion hole in the second side plate (4), and the second side plate (4) is reinforced by one of a rib and a web in the area of each respective insertion hole.

* * * * *